United States Patent [19]

Baumgarten

[11] 4,118,162

[45] Oct. 3, 1978

[54] APPARATUS FOR MANUFACTURING LENGTHS OF RUBBER HOSE OF CURVED SHAPE

[75] Inventor: Wilfried Baumgarten, Pattensen, Fed. Rep. of Germany

[73] Assignee: Paul Troester Maschinenfabrik, Fed. Rep. of Germany

[21] Appl. No.: 730,002

[22] Filed: Oct. 6, 1976

[51] Int. Cl.² .......................................... B29D 23/04
[52] U.S. Cl. .................................. 425/113; 264/209; 264/285; 264/295; 425/308; 425/325; 425/380; 425/392
[58] Field of Search ............... 264/172, 209, 236, 347, 264/285, 339, 295; 425/467, 468, 466, 381, 380, 326.1, 532, 113, 114, 325, 377, 392, 393

[56] References Cited

U.S. PATENT DOCUMENTS

| | | | |
|---|---|---|---|
| 2,657,431 | 11/1953 | Slaughter | 264/172 X |
| 2,964,796 | 12/1960 | Press | 264/339 X |
| 3,538,207 | 11/1970 | Toole | 425/113 X |
| 3,936,519 | 2/1976 | Crystal | 425/113 X |
| 4,017,232 | 4/1977 | Holden et al. | 425/114 X |

OTHER PUBLICATIONS

West German Offenlegungsschrift 2359746, 6-1974.

Primary Examiner—Francis S. Husar
Assistant Examiner—Mark Rosenbaum
Attorney, Agent, or Firm—Robert E. Burns; Emmanuel J. Lobato; Bruce L. Adams

[57] ABSTRACT

Apparatus for manufacturing lengths of rubber hose of curved shape comprises means for feeding a sequence of flexible mandrels in end-to-end relation to and through a first extruder which extrudes a continuous rubber hose onto the string of mandrels. Downstream of the extruder there is means for wrapping reinforcing thread around the hose and a second extruder for extending a second layer of rubber onto the reinforced hose. Downstream of the second extruder the hose is cut at locations between successive mandrels to form separate lengths of hose each with a flexible mandrel therein. Clamping means engages opposite ends of each mandrel with a hose length thereon and forces the ends toward one another to bend the mandrel and hose to curved form. While thus held in curved form, the hose lengths are vulcanized. The mandrels are then removed while evacuating the interior of the mandrel to contract it and forcing pressure fluid between the mandrel and the curved hose length to facilitate the removal.

13 Claims, 6 Drawing Figures

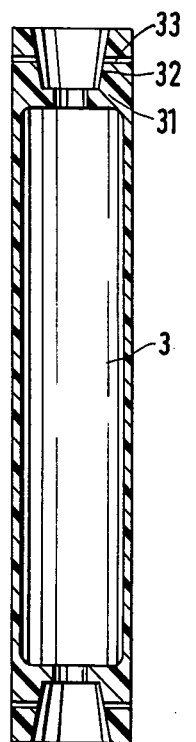
FIG. 2
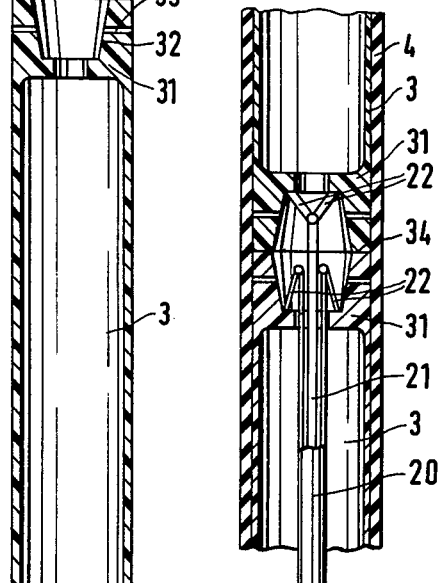
FIG. 3
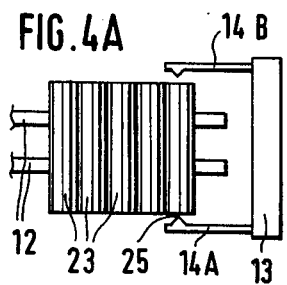
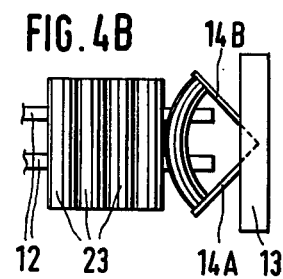
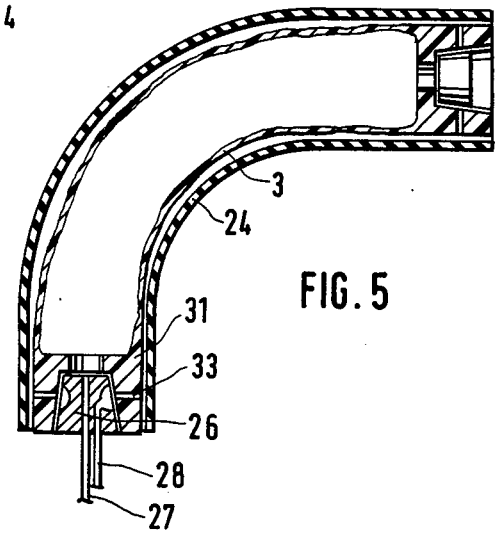
FIG. 5

APPARATUS FOR MANUFACTURING LENGTHS OF RUBBER HOSE OF CURVED SHAPE

FIELD OF INVENTION

The present invention relates to a process and apparatus for the manufacture of rubber hoses of curved shape, comprising an extruder, a cutting device for the extended strand, curved mandrels, and a vulcanization unit.

BACKGROUND OF THE INVENTION

Rubber hoses of curved shape are required in machine construction, and in most cases in engine construction, in order to conduct liquid from one part of a machine to another in a narrow space. They have the advantage that they are elastic and can therefore also be used in places where the machine parts carry out small relative movements with respect to each other. Such curved hose lengths have their curvature imparted to them prior to vulcanization so that they retain this curvature for their entire life. Generally, curvatures of a considerable angle in a small space are imparted here to the piece of hose.

The manufacture of such curved pieces of hose is effected by producing a strand in an extruder, behind which possibly a textile-thread wrapping machine as well as a second extruder are arranged, the strand being cut into pieces of the required length by means of a cutting device. These cut pieces, after they have been cooled, are placed manually on mandrels and then introduced into a vulcanization unit. Here the lengths of hose are vulcanized on the mandrels, in the position contemplated for them, with the corresponding curvatures. In the manufacture of such curved pieces of hose a large amount of manual work is carried out. This makes these pieces of hose expensive.

SUMMARY OF THE INVENTION

The object of the present invention is to effect the application of the pieces of hose to the mandrels automatically and avoid, as far as possible, any manual work, even upon the removal of the vulcanized curved pieces of hose.

The invention resides in the fact that a plurality of individual flexible mandrels lying end to end in a line are surrounded in an uninterrupted sequence by a rubber mix to form a continuous tubular strand, whereupon each individual mandrel is cut off from the line together with the rubber mix surrouding it, each individual mandrel, together with the tubular rubber mix present on it, is bent into the desired shape and the mandrel bent in this shape is then held and vulcanized.

Due to the fact that the extrusion unit in which a tubular strand is extruded is so charged with a.plurality of individual flexible mandrels, which lie closely together end to end, that the tubular strand places itself around the line of flexible mandrels, the result is obtained that there discharges from the extrusion unit a tubular strand which surrounds the plurality of individual mandrels, each of which has the length necessary for the production of one curved piece of hose. It is now merely necessary to cut the tubular strand by cutting the strand at the boundary between two mandrel ends in order to obtain the individual workpieces which are to be vulcanized. In this way the tedious manual work previously required in order to place the cut length of hose on the mandrel is dispensed with. However, at the same time one also dispenses with the cooling of the strand which was necessary in order that this manual work could be performed. The hot strand can thus now be fed, with the temperature which it has, to the vulcanization after the mandrel with the piece of tube present on it has been brought into the desired shape. This can be done in simple manner, and even automatically. The flexible mandrels can be so developed at their ends as to permit the insertion into these ends of parts of mounts which, after the curving of the mandrel with the length of hose surrounding it, are made fast to mounts which pass through the vulcanization unit on a conveyor device. These mounts are preferably developed at the same time in the manner that they are multipartite and are placed by a machine on the ends of the mandrels, and thereupon swung away so that the parts of the mount contact each other at the end of the swinging movement and snap together upon this contact or are otherwise fastened to each other, whereupon the mount is placed by machine on the conveyor device. In this way, manual work can be substantially or completely eliminated at this place also. In addition, the possibility is afforded here - if manual work is carried out - of handling the hot mandrels and lengths of hose without any detrimental effects from this to the person handling them.

When carrying out this process, the mandrels surrounded with a rubber mix can be wrapped with reinforcing threads and then provided with a second layer of rubber before they are cut. In this way one obtains the production of reinforced rubber hoses.

It is advisable to degasify the layers of rubber upon application to the mandrels and dry them. In this case it is not necessary subsequently to effect the vulcanization under pressure, and continuous operation can more easily be achieved.

For the removal from the mandrel, it is advisable to introduce compressed air between the rubber hose obtained after the vulcanization and the mandrel, and thereby lift the rubber hose away from the mandrel. It is therefore advisable to develop the mandrel directly in such a manner that a compressed-air connection is present within it, which leads at different points to the surface of the mandrel, where compressed air can then flow out and lift the resultant rubber hose off. It may also be advisable to develop the mandrel in such a manner that it can be connected to a vacuum system, so that due to the pumping-out of air the mandrel changes its shape and collapses or at least shrinks so that easy removal of the mandrel is in this way possible.

The apparatus of the invention for the production of rubber hoses of curved shape having an extruder, a cutting device for the extruded strand, curved mandrels, and a vulcanization unit is characterized by the fact that an apparatus which feeds mandrels closely end to end in a strand to the extruder, is provided; that the mandrels are flexible; that a control device is provided which places the cutting device in operation at the place between two mandrels; and that mounts for mandrels which have been brought into curved shape and have the length of hose present thereon are provided in the vulcanization unit, as well as a conveyor device for said mounts. With this apparatus it is possible to produce curved pieces of hose very rapidly, simply, and with little manual labor. The extrusion plant can consist of two or even three extruders between which units for the wrapping of the extruded piece or pieces of tube with textile thread are provided, so as to obtain reinforced hoses.

It is advantageous to provide a magazine for the mandrels in front of the device which feeds the mandrels to the extruder.

In order that the cutting device can cut perfectly and without damaging the mandrels it is advantageous to provide, in the region of the cutting device, a device which moves the last two mandrels in the strand a distance apart from each other. Such device may be a clamp which is movable, for instance, by hydraulic forces and acts on the last mandrel, moving the latter somewhat faster than the speed of the strand so that a free space in which the cutting device can engage is formed between the last and the next to the last mandrel, without having to act on the mandrels. The strand can be stretched somewhat at the cutting point, but the last mandrel can also be displaced somewhat with respect to the strand, i.e. be pulled out.

It is advisable for a conveyance device, for instance a chute, to be arranged behind the cutting device, it conveying the cut lengths of tube with the mandrels contained therein towards the vulcanization unit.

The mandrels and the pieces of hose present on them must be brought into the desired curved shape in front of the vulcanization unit. This can be done manually. For this purpose a worker applies two wedges of a holder in such a manner against the ends of the mandrel that after the application he can, by means of the two parts of the holder, curve the mandrel and the piece of tube present on it without having to grasp the hot mandrel or the hot piece of hose. At the end of this curving process, he then places the two parts of the holder together in such a manner that they are firmly connected with each other, for instance by a snap fastener, and can then be placed on the conveyor device leading to the vulcanization apparatus. This manual work is very simple, as compared with the difficult work of pulling pieces of hose over curved mandrels, which previously had to be effected.

However, the work can be even further simplified by effecting it automatically. A device can be provided here for gripping, bending, and clamping the ends of the mandrels on holders together with the lengths of tubes which have been applied to the mandrels. This apparatus is of very simple construction; it has two movable holders which have grasped two parts of the mounts and introduce them, together with their fastening devices, into the ends of the mandrels. Since the holders are swingable, the mounting parts can be so swung with them that their ends are introduced into each other at the end of the swinging process and held together, for instance, by means of a snap fastener. This apparatus then delivers the mounts which have been assembled in this manner to the conveyor belt which passes through the vulcanization unit.

It is advisable to provide a mandrel-removal device behind the vulcanization apparatus. This device will preferably operate with compressed air.

BRIEF DESCRIPTION OF THE DRAWING

The essence of the invention will be explained in further detail with reference to the embodiments shown diagrammatically in the drawing, in which FIG. 2 is a section through a mandrel, FIG. 3 shows the tool of a separating device operating in the region of the cutting device.

FIGS. 4A and 4B are movement diagrams of the apparatus for the gripping, bending, and clamping of the ends of the mandrels, FIG. 5 shows a mandrel during the mandrel-removal process.

DESCRIPTION OF THE PREFERRED EMBODIMENTS

Figure 1:
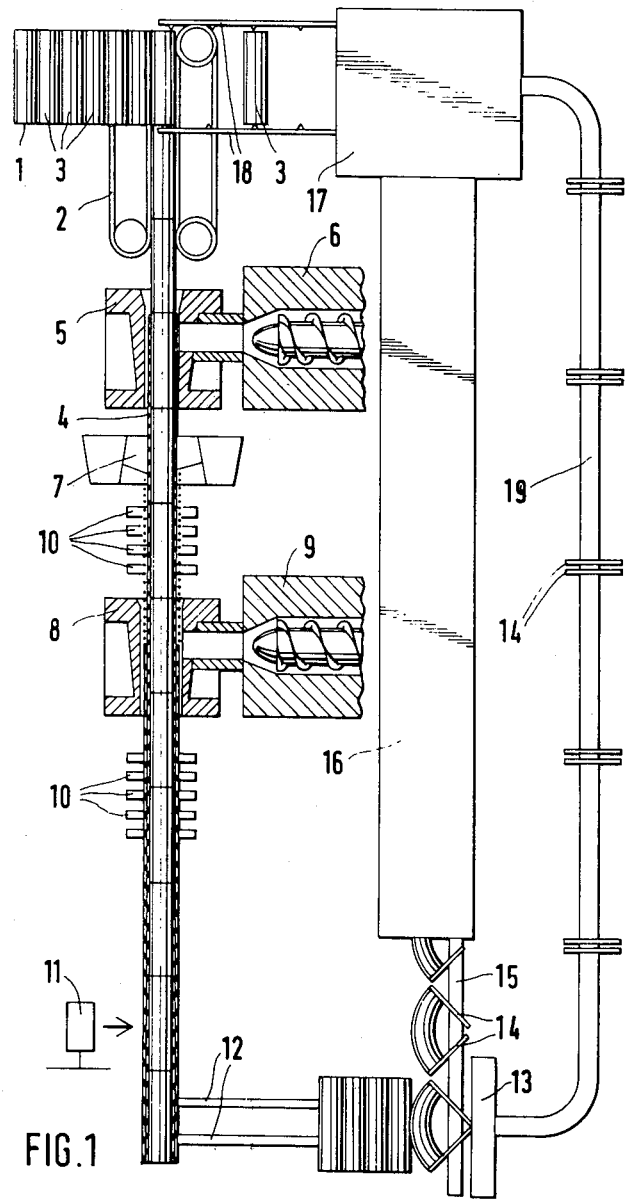
FIG. 1 is a plan view of the entire apparatus.

Mandrels 3 are conveyed on the mandrel magazine 1 by means of the conveyor belts 2 into the corresponding entrance 5 of the extrusion unit, lying end to end in a long line. The extrusion unit consists of a first extruder 6 which conveys the rubber mix prepared by it into the tubular extruder head 5. In the tubular extruder head 5, the mandrels 3, which lie end to end in a strand, are covered with a rubber mix in the form of a continuous hose 4. A thread reinforcing machine 7 applies a textile thread reinforcement to this hose 4. Thereupon the line of mandrels 3 and of rubber mix forming the hose 4 passes through another tubular extrusion head 8, which is connected to the extruder 9. Here, a second coat of rubber in tubular form is applied to the hose. Within the extrusion apparatus there can be provided, furthermore, conveyor devices 10 which transport the hose. Behind the extrusion devices 5 and 9 there is provided a cutting device 11, by which the resultant hose is cut into individual pieces. The individual pieces drop via the chute 12 into the apparatus 13 where the mandrels 3 are gripped, bent and clamped at their ends in mounts 14. They are placed here on a conveyor belt 15 which conducts them through the vulcanization unit 16. At the end of the vulcanization unit 16 there is a mandrel-removal device 17 from which the mandrels 3 are conducted, via the conveyor device 18, into the mandrel magazine and the mounts 14 are conducted, via the conveyor 19, into the apparatus 13 for the gripping, bending, and clamping of the ends of the mandrels.

Each mandrel 3 consists of flexible material. At both of its ends it has extensions 31 each with a conical recess 32. These conical recesses 32 serve for the gripping of the mandrels. In the region of the extensions 31, channels 33 which extend from the conical recess 32 lead to the surface of the extension 31. These channels serve for feeding compressed air below the piece of hose 4 for the lifting-off thereof at the end of the manufacturing process. In its central portion, each mandrel 3 is preferably so developed that it shrinks or collapses due to the pumping of the air out of it, so that the removal of the completely curved piece of hose from the mandrel is thereby facilitated.

FIG. 3 shows the separating apparatus; the last two mandrels 4 on which the coherent hose layer 4 is present are to be separated from each other. For this purpose, a tube 20, having a rod 21 within it, is introduced into the last mandrel. Both the tube 20 and the rod 21 bear at their end a holding device 22 which can be swung open and, when it has been swung open, seats itself firmly in the conical recess 32 of the mandrel 3. By a relative movement between the rod 21 and the tube 22, two mandrels 3 can in this way be pushed apart so as to produce between their adjacent ends 34 a space into which the separating knife 11 can engage.

FIG. 4 shows the processes which take place in the apparatus 13 for the gripping, bending, and clamping of the ends of the mandrels in the mounts 14.

FIG. 4 A shows a number of mandrels with hose pieces 23 lying on the chute 12. Two mount parts 14 A and 14 B guided by the apparatus 13 engage laterally, by conical points 25 arranged on their ends, into the conical recesses 32 of the mandrel and grip the latter. Thereupon, as shown in FIG. 4 B, the mount parts 14 A and 14 B are so moved by the apparatus 13 that, on the one hand, the mandrel 3 with the hose length 24 is brought into a curved position and, on the other hand, the ends of the two mount parts 14 A and 14 B which are removed from the conical tips 25 are moved against each other so that — for instance by means of a snap lock — the two parts 14 A and 14 B are fastened together. By means of a device not shown in the drawing the mount 14 is then transferred to the conveyor belt 15 which passes through the vulcanization unit.

If the mount 14 is removed at the end of the vulcanization, the mandrel removal must be effected. For this purpose a connecting piece 26 is introduced into a conical recess 32. This connecting piece has at its center a vacuum line 27 by which the hollow inside of the mandrel 3 can be evacuated. The tubular extension, in addition to this, has a pressure line 28 by which compressed air can be introduced into the channels 33. By means of this compressed air the finished hose length 24 is lifted in the region of the extension 31 while at the same time the inside of the mandrel 3 is evacuated. In this way the curved hose produced can be easily removed from the mandrel. It is advisable to introduce two tubular connections into the two ends of the mandrel 3 during the mandrel removal.

I claim:

1. Apparatus for manufacturing lengths of rubber hose of curved shape, comprising rubber extrusion apparatus, means operatively associated with said extrusion apparatus for feeding to and through said extrusion apparatus a sequence of flexible mandrels in end-to-end relation for extrusion onto said mandrels of a continuous rubber hose, means downstream of said extrusion apparatus for cutting said hose at locations between successive mandrels to form hose lengths each having a flexible mandrel therein, means downstream of said cutting means for bending successive mandrels with said hose lengths thereon into curved form and means for vulcanizing said hose lengths while held in curved form by said mandrels to form vulcanized rubber hose of curved shape, said mandrels being thereafter removed from said curved hose lengths.

2. Apparatus according to claim 1, further comprising means for separating successive mandrels slightly at the location where said hose is to be cut, said hose being cut at said location while said successive mandrels are held separated.

3. Apparatus according to claim 1, in which said means for bending said mandrels with said hose lengths thereon comprises means engaging in opposite ends of each mandrel and bringing said ends toward one another to bend said mandrel and the hose length thereon.

4. Apparatus according to claim 1, in which said feeding means comprises a magazine for mandrels and means for feeding said mandrels to said extrusion apparatus.

5. Apparatus according to claim 1, further comprising means for removing said mandrels from said curved hose lengths after vulcanization.

6. Apparatus according to claim 5, in which each mandrel comprises a flexible tubular body portion with recessed end portions and in which said removing means comprises means for applying a vacuum to the interior of said mandrel and applying fluid pressure between said mandrel and the hose length thereon to contract the mandrel and to separate the hose length from the mandrel.

7. Apparatus according to claim 1, in which each of said mandrels comprises a flexible tubular body portion and opposite end portions each having a conical recess therein.

8. Apparatus according to claim 7, in which there is an opening from said recess in said end portion into the interior of said body portion.

9. Apparatus according to claim 8, in which there is at least one channel from said recess to the exterior circumferential surface of said mandrel.

10. Apparatus according to claim 9, comprising means for removing said vulcanized curved hose length from the respective mandrel, said removing means comprising a connecting piece fitting snugly into said conical recess of at least one end portion of the mandrel, said connecting piece having a first passage connecting with said opening to draw a vacuum in the interior of said mandrel and a second passage connecting with said channel to supply pressure fluid between the circumference of said mandrel and said curved hose length.

11. Apparatus according to claim 7, comprising means for separating successive mandrels slightly at the location where the hose is to be cut, said separating means comprising means engaging respectively in said recess of adjacent mandrel ends and means extending out through one mandrel for moving said engaging means apart to separate said adjacent mandrel ends.

12. Apparatus according to claim 1, further comprising means located downstream of said extruder for applying a textile thread reinforcement to said hose while it is still on said mandrels and before said hose is cut into lengths by said cutting means.

13. Apparatus according to claim 12, further comprising second extruder apparatus located downstream of said reinforcement applying means for extruding a second coat of rubber in tubular form onto said reinforced hose before said hose is cut into lengths by said cutting means.

* * * * *